United States Patent [19]

Dankovic et al.

[11] Patent Number: 4,747,886
[45] Date of Patent: May 31, 1988

[54] TUBE FIN REMOVAL ROBOT

[75] Inventors: Richard A. Dankovic; Allyn E. Haase; Ralph E. Spada, all of Canal Fulton, Ohio

[73] Assignee: The Babcock & Wilcox Company, New Orleans, La.

[21] Appl. No.: 61,857

[22] Filed: Jun. 12, 1987

[51] Int. Cl.⁴ .............................................. B23K 7/10
[52] U.S. Cl. ..................................... 148/9 R; 266/67; 266/71
[58] Field of Search .................... 266/67, 71; 148/9 R

[56]  References Cited
U.S. PATENT DOCUMENTS 2,452,189 10/1948 Helmkamp ............................ 266/71
2,617,644 11/1952 Helmkamp ............................ 266/71

Primary Examiner—Wayland Stallard
Attorney, Agent, or Firm—Vytas R. Matas; Eric Marich; Robert J. Edwards

[57]  ABSTRACT

A robot drive for cutting fins having pipes extending on opposite sides therefrom, with the pipes laying in parallel spaced apart rows, comprises a carriage which can move in the longitudinal direction between rows of the pipes. A pair of driven guide rollers is mounted to the carriage for rolling against the pipe of one of the rows. The carriage also carries four spring loaded pressure wheels which bear against the fins of the pipe in an adjacent row so as to press the carriage and guide rollers against the pipe on which the guide rollers roll. A pair of cutting torches or mechanical cutters are connected to the carriage on opposite sides of the guide rollers so that they can cut the fins of the pipes on which the guide rollers roll.

11 Claims, 3 Drawing Sheets

4,747,886

TUBE FIN REMOVAL ROBOT

FIELD AND BACKGROUND OF THE INVENTION

The present invention relates in general to self-moving metal cutting equipment, and in particular to a new and useful robot structure which carries one or more cutting heads for cutting the fins from a tube and which is moveable along the tube.

Various metal cutting devices are known which have some sort of cutting head such as a torch or mechanical cutter, which is mounted on a carriage and which is moveable for cutting along a workpiece.

According to the present invention, a wheeled carriage carries a pair of arcuate drive rollers that ride against a tube which carries fins to be cut. The carriage also carries one or more cutting heads which may be in the form of torches or mechanical cutters, for cutting one or more fins connected to the tube. Spring loaded wheels riding against the fins of adjacent tubes press the carriage toward the tube having the fins to be cut for guiding the carriage as it is driven along the tube by the drive rollers.

Various devices are known which include cutting torches which are mounted on carriages that can be moved along a selected path to cut a workpiece.

U.S. Pat. No. 2,617,644 to Helmkamp and U.S. Pat. No. 2,782,024 to Demmer et al, disclose universal gas torch cutting machines. The term "univeral" means that the torch can move throughout a horizontal plane so that a pattern followed by a tracer connected to the torch can be cut into the workpiece. In Helmkamp, the apparatus rests on the workpiece and a motorized tracer, attached to one end of a bar that is slidably mounted through a wheeled carriage, traces a pattern that is then duplicated by the torch attached to the other end of the bar. The wheeled carriage rolls along a tubular monorail which rests on the workpiece. Demmer, et al is merely a modification of Helmkamp, and employs a pair of tubular monorails to support two wheeled carriages while a tracer traces a pattern that will be followed by a plurality of cutting torches.

Neither Helmkanp nor Demmer, et al teach or suggest a wheeled carriage that rides on and is driven by contact of arcuate drive rollers with a workpiece itself. Further, since these references are designed to rest upon the pattern and workpiece, they contain no spring loaded wheels that press against fins of an adjacent tube to keep the wheeled carriage positioned between the workpiece and the adjacent tube.

U.S. Pat. No. 2,737,383 to Baumgartner discloses a three dimensional cutting apparatus comprising a torch mounted on a motorized carriage. The carriage moves horizontally and then vertically along a pair of parallel round bar tracks which are separate from the workpiece and which have a predetermined contour. Upper and lower wheels, having a shape matching the round bar tracks, are used to position and move the motorized carriage. Baumgartner thus provides a track that is separate from the workpiece on which his device travels.

U.S. Pat. No. 3,071,360 to Scarince discloses a self-propelled flat stock cutting machine employing a torch and at least two sets of pressure rollers. Particular reference is made to FIG. 9 of the reference that shows a stationary embodiment. Grooved rollers allow the carriage to roll on the frame of the machine. These rollers do not drdive by contact with the workpiece itself.

U.S. Pat. No. 3,190,628 to Litzka discloses a cutting apparatus for a horizontal I-beam according to a cam pattern that is traced on a revolving drum. While the apparatus rides on the I-beam itself, a separate gear rack and pinion are used to propel the carriage along the beam.

U.S. Pat. No. 4,327,898 to Grant et al discloses a traveling torch that rides along a separate track made of simple angle iron, and laid upon or near the workpiece. Again, there is nothing in Grant et al to teach or support that the geometrical features of the workpiece itself can be used for guiding or driving a motorized torch.

U.S. Pat. No. 4,405,117 to Ohlaug and U.S. Pat. No. 4,469,311 to Laing disclose manual and motorized hand torches with wheeled means for positioning the tip of the torch at a predetermined distance from the workpiece.

SUMMARY OF THE INVENTION

The present invention is drawn to a robot device which is capable of cutting fin from a tube where the tube plus fins form a structure that lies in a plurality of spaced apart rows of similar structures.

According to the present invention, a carriage carries one or more driven guide rollers which roll against a tube having fins to be cut. The carriage carries one or two cutting heads which are directed at the fins to be cut. The carriage also carries a plurality of spring-loaded pressure rollers which press against the fins of tubes in an adjacent row so as to urge the carriage and guide rollers against the tube having the fins to be cut.

Drive means, such as a D.C. drive motor is connected to each of the rollers. In this way the carriage can be driven in the longitudinal direction along the tubes so that the fins can be cut by any desired length along the tubes.

Normally the fins are required to be cut a certain specified distance from the tubes for the entire longitudinal cut without damage to the tubes. The cutting head is such that it can be set to obtain a required cut distance from the tube and maintains that set distance throughout the length of the cut since the carriage is guided by the tube.

Lateral drive means may also be used for moving the cutting heads laterally across the fins to complete a cut and to thus remove the cut off section of fin from its associated tube.

The cutting head may be a mechanical cutter or may be a torch such as a plasma arc torch, an oxy-fuel torch or an air arc torch.

Hoses and power lines are connected to the drive means and cutting heads and may extend by any desired length to permit the robot device to move along the tubes.

Normally the space between the tubes is quite confined and does not permit easy access for cutting equipment. By utilizing the present invention, fins can be cut from even closely spaced tubes in an easy and economical manner.

Accordingly an object of the present invention is to provide a robot device for cutting fins from tubes or pipes which carry the fins, each pipe having fins forming a structure with the structures lying in spaced apart rows, comprising a carriage, a guide roller mounted to the carriage and adapted to roll against a first one of the structure in a first one of the rows, at least one pressure wheel mounted to the carriage and adapted to roll against a second one of the structures in an adjacent second row, biasing means for pressing the pressure wheel against the second structure to thereby urge the guide roller against the first structure, drive means for rotating either the guide roller or the pressure roller for driving the carriage in a longitudinal direction along the first and second structures, and at least one cutting head connected to the carriage for cutting the fin from one of the structures.

A further object of the invention is to provide a robot drive which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, references is made to the accompanying drawings and descriptive matter in which a preferred embodiment of the invention is illustrated.

DESCRIPTION OF THE PREFERRED EMBODIMENT

Figure 1:
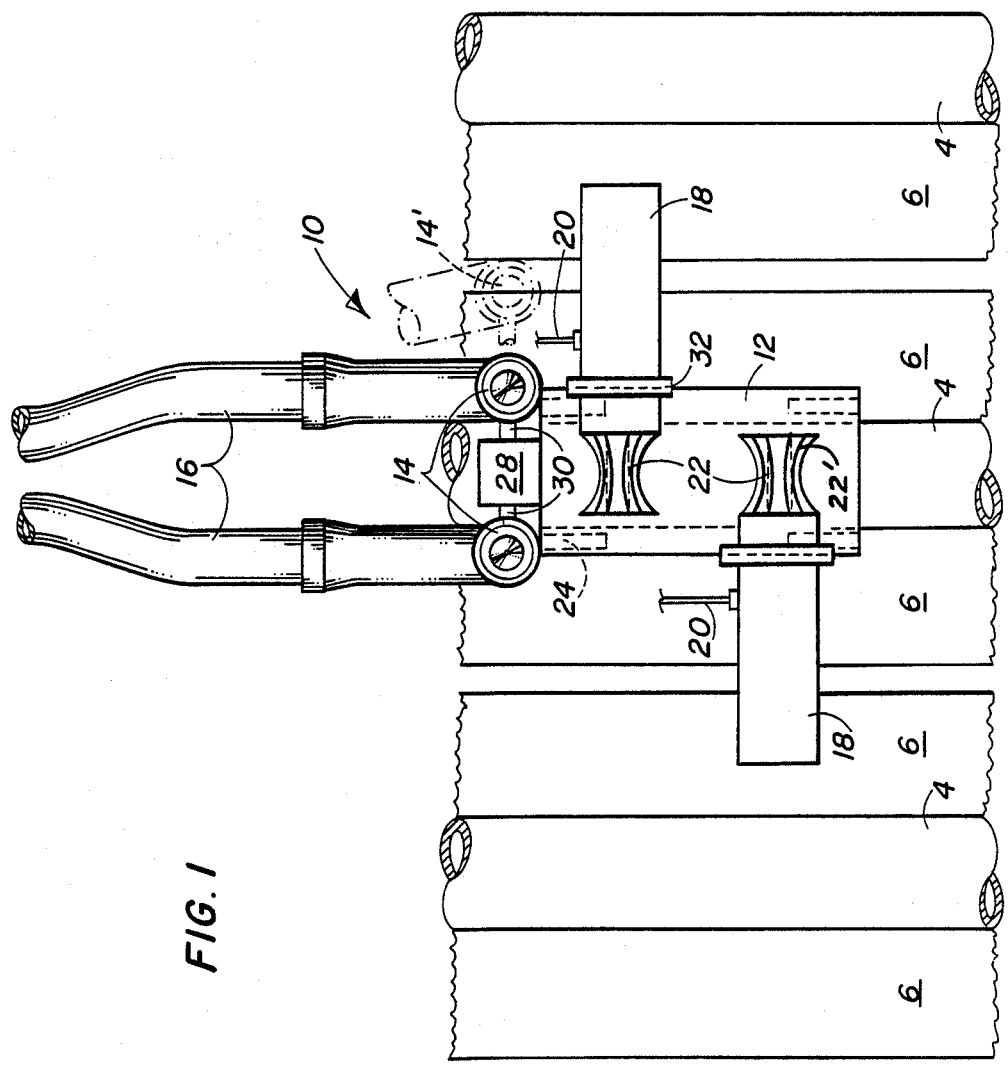
FIG. 1 is a side elevation view showing the robot device of the present invention and structures having tubes or pipes and fins which can be cut with the invention.
Figure 2:
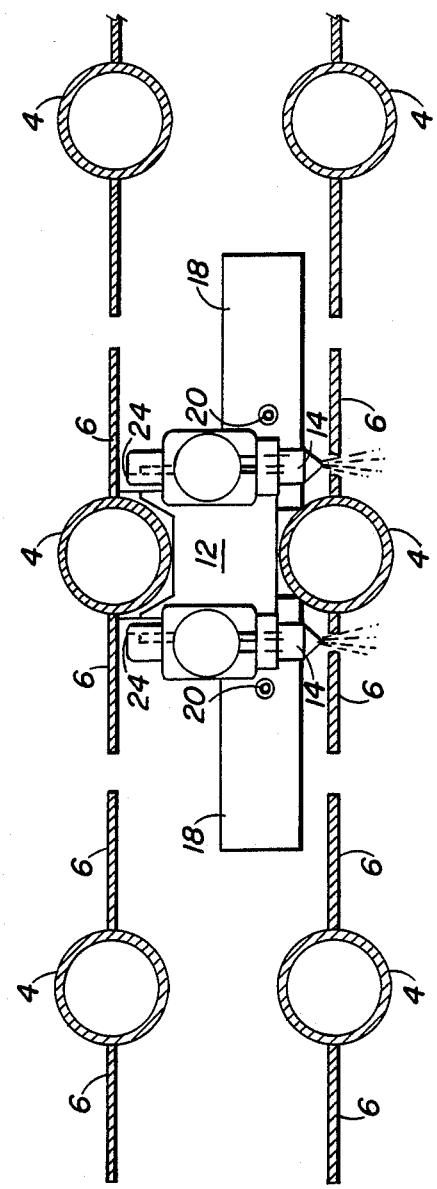
FIG. 2 is a top plan view of two rows of structures including the tubes or pipes and fins, with the robot device according to FIG. 1 therebetween.
Figure 3:
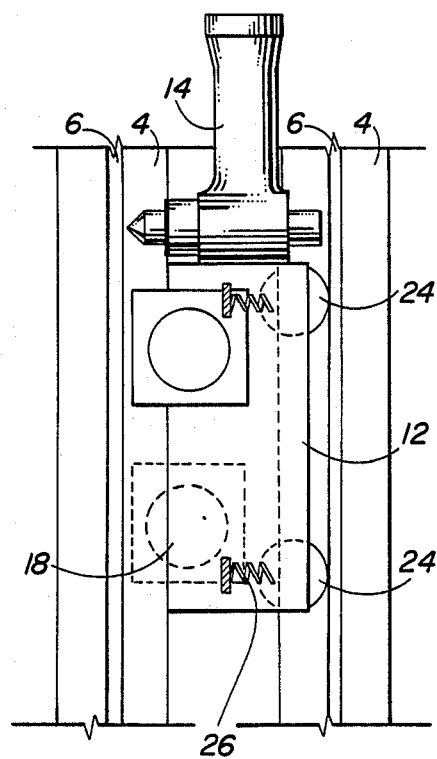
FIG. 3 is a side elevational view of the robot device position between two rows of structures comprising pipes or tubes with fins extending therefrom.

Referring to the drawings in particular, the invention embodied therein comprises a robot device generally designated 10 which is self-propelled in the longitudinal direction between rows of structures which each comprise a tube or pipe 4 with opposite extending fins 6.

The robot device comprises a carriage 12 which, on one side, carries a pair of guide or drive rollers 22. Each of the guide or drive rollers 22 has a concave cylindrical periphery which is shaped to correspond to the outer contour of the generally cylindrical tube or pipe 4, and to roll against this outer periphery. The guide or drive rollers 22 can be made of carbon steel with hardened surface serrations 22' for gripping the surface of the tube or pipes 4.

Each of the guide or drive rollers 22 is driven by its own DC drive motor 18 which is controlled and powered over lines 20.

Four pressure rollers 24 are mounted to the corners of the carriage 12 over springs 26. The pressure rollers 24 are pressed by their springs 26 against the opposite fins 6 of a second tube or pipe 4 in a second row that is adjacent to and spaced away from the row containing the tube or pipe 4 against which the guide or drive rollers 22 roll. The four pressure rollers 24 can also be surface hardened carbon steel for wearability.

By virtue of the biasing force of springs 26 and the pressure of the pressure rollers 24 against the fins 6, the guide or drive rollers 22 are urged against the pipe or tube 4 in the adjacent row.

By powering the drive motors 18, guide or drive rollers 22 rotate and propel the carriage 12 in the longitudinal direction along the pipe or tubes 4.

Cutting heads 14 are also connected to the carriage 12 and are preferably positioned on opposite sides of the pipe or tube 4 along which the guide or drive rollers 22 roll. The nozzle of each cutting head 14 is directed toward one of the fins 6 to be cut away from its associated tube or pipe 4.

The cutting heads 14 may be plasma arc torches, oxy-fuel torches or air arc torches. Alternatively, mechanical cutting heads can be used.

The cutting heads 14 may be mounted to lateral drive means 28 which, for example, may be a piston with piston rods 30 that are connected to the cutting heads. This can be activated to cause a lateral sideways movement of the cutting heads (see the phantom line position 14 prime in FIG. 1), to laterally cut a fin 6 after a longitudinal cut has been made.

Alternatively, the entire carriage 12 can be moved from side to side with only the appropriate cutting head 14 activated to laterally cut the fins. Another alternative is to use a separate long-handled torch for making the final lateral cut in each fin 6.

According to the present invention, very lengthy longitudinal cuts can be made along the fins simply by supplying sufficiently long lines 20 for the drive motors 18 and sufficiently long supply homes 16 for the cutting heads 14.

Once the desired longitudinal cut has been made, a lateral cut can be made in accordance with the possibilities noted above.

While a specific embodiment of the invention has been shown and described in detail to illustrate the application of the principles of the invention, it will be understood that the invention may be embodied otherwise without departing from such principles. For example, while the preferred embodiment of the invention has shown the cutting heads 14 operative to remove the fins 6 attached to the pipe or tube 4 upon which the guide or drive rollers 22 ride, the cutting heads 14 could be rotated 180 degrees to effect the removal of fins 6 upon which the pressure rollers 24 roll.

What is claimed is:

1. A method for cutting fins from the pipes carrying fins, each with its fins forming a structure lying in a plurality of spaced apart rows of such structures, each of the structures extending in a longitudinal direction which is substantially transverse to the spacing between the rows of structures, the method comprising the steps of:

rolling a guide roller, mounted to a carriage, against a first one of the structures in a first one of the rows;

rolling at least one pressure wheel mounted to the carriage, against a second one of the structures in an adjacent second one of the rows which is spaced from the first one of the rows;

supporting the carriage between the first and second rows;

pressing the guide wheel against the first structure when the carriage is between the first and second rows of structures;

rotating at least one guide roller and the pressure wheel and moving the carriage in the longitudinal direction between the first and second rows;

cutting one of the fins of one of the first and second structures with a cutting head while moving the carriage in the longitudinal direction.

2. A robot device for cutting fins from pipes carrying the fins, each pipe with its fin forming a structure lying in a plurality of spaced apart rows of such structures, each of the structures extending in a longitudinal direction which is substantially transverse to the spacing between the rows of structures, the robot devices comprising:
   a carriage;
   a guide roller mounted to said carriage and adapted to roll against a first one of the structures in a first one of the rows;
   at least one pressure wheel mounted to said carriage and adapted to roll against a second one of the structures in an adjacent second one of the rows which is supported between the first and second rows;
   biasing means connected to said pressure wheel against the second structure to press said guide wheel against the first structure when said carriage is between the first and second rows of structures;
   drive means connected to one of said roller and said pressure wheel to move said carriage in the longitudinal direction between the first and second rows; and at least one cutting head connected to said carriage at a location for cutting one of the fins of one of the first and second structures while said carriage moves in the longitudinal direction.

3. A robot device according to claim 2, wherein said drive means is connected to said guide roller for rotating said guide roller to move said carriage.

4. A robot device according to claim 3 wherein the pipe of each structure has an outer contour and each pipe has fins extending outwardly from opposite sides of the pipe, said guide roller having a contour corresponding to the outer contour of a pipe for engaging on and rolling along the pipe, said robot drive including a second pressure wheel connected to said carriage, said first mentioned and second pressure wheels being positioned for rolling along fins of the pipe of the second structure with the pipe of the second structure said first mentioned and additional pressure wheels.

5. A robot device according to claim 4 including a second cutting head, said first mentioned cutting head being directed at a fin on one side of the pipe of the first structure and the second cutting head being directed at an opposite fin of the pipe of the first structure.

6. A robot device according to claim 5 wherein each of said cutting heads comprises one of a plasma arc torch and oxy-fuel torch and an air arc torch.

7. A robot device according to claim 5 including a second guide roller mounted to said carriage at location on said carriage spaced from said first mentioned guide roller in the longitudinal direction, and second drive means connected to said second guide roller for driving said second drive roller, said second guide roller being contoured to engage the outer contour of the pipe.

8. A robot device according to claim 7 wherein said first and second drive means comprise separate motors connected to said first mentioned and second guide rollers for rotating said guide rollers.

9. A robot device according to claim 7 including third and fourth pressure wheels connected to said carriage, said first mentioned, second, third and fourth pressure wheels being connected at near corners of said carriage with two of said pressure rollers being mounted for engagement against one fin of the pipe and the other two pressure rollers being mounted for engagement against the other fin of the pipe.

10. A robot drive according to claim 9 wherein said biasing means comprises springs connected between said carriage and each of said pressure wheels.

11. A robot drive according to claim 9 wherein the outer contour of the pipe is cylindrical, each of said guide rollers having a concave cylindrical perfory for rolling against the pipe.

* * * * *